United States Patent
Herr

[11] Patent Number: 6,025,093
[45] Date of Patent: Feb. 15, 2000

[54] LITHIUM ION CELL

[75] Inventor: Rudolf Herr, Kelheim, Germany

[73] Assignee: Varta Batterie Aktiengesellschaft, Hannover, Germany

[21] Appl. No.: 09/006,012

[22] Filed: Jan. 12, 1998

Related U.S. Application Data

[63] Continuation of application No. PCT/EP96/02214, May 23, 1996.

[30] Foreign Application Priority Data

Jul. 31, 1995 [DE] Germany ................ 195 28 049

[51] Int. Cl.[7] .................... H01M 10/38; H01M 10/40
[52] U.S. Cl. ............. 429/231.4; 429/94; 429/231.8; 429/232; 205/59
[58] Field of Search ................. 429/94, 231.4, 429/231.8, 231.95, 232, 8; 205/59

[56] References Cited

U.S. PATENT DOCUMENTS

| | | | |
|---|---|---|---|
| Re. 33,306 | 8/1990 | Hayashi et al. | 429/194 |
| 5,028,500 | 7/1991 | Fong et al. | 429/194 |
| 5,147,739 | 9/1992 | Beard | 429/194 |
| 5,358,802 | 10/1994 | Mayer et al. | 429/218 |
| 5,541,022 | 7/1996 | Mizumoto et al. | 429/218 |
| 5,756,232 | 5/1998 | Kelly et al. | 429/232 |

FOREIGN PATENT DOCUMENTS 0 328 131  8/1989  European Pat. Off. .

*Primary Examiner*—Maria Nuzzolillo
*Assistant Examiner*—Carol Chaney
*Attorney, Agent, or Firm*—Weiser and Associates, P.C.

[57] ABSTRACT

The invention relates to a lithium ion cell, comprising a positive electrode which contains a chalkogen compound, containing lithium, of a transition metal, a non-aqueous electrolyte and a negative electrode which is separator-isolated and contains carbon, which is characterized in that the cell contains lithium metal or a lithium alloy in a form physically separated from the electrodes, the lithium metal or the lithium alloy having a connection for the main lead of an electrode and, via the electrolyte, an ionic connection for the electrodes.

10 Claims, 1 Drawing Sheet

LITHIUM ION CELL

This is a continuation of PCT/EP96/02214, filed May 23, 1996.

BACKGROUND OF THE INVENTION

1. Field of the Invention

The invention relates to a lithium ion cell, comprising a positive electrode which contains a chalkogen (i.e., chalcogen) compound containing lithium, of a transition metal, a non-aqueous electrolyte and a negative electrode which is separator-isolated and contains carbon.

2. Description of the Related Art

It is known from the document J. M. Tarascon and D. Guyomard, Electrochimica Acta, Volume 38, No. 9, pages 1221–1231 (1993) that lithium ion cells of the abovementioned type suffer an irreversible loss of lithium ions after the first charge/discharge cycle, which leads to a 25–50% loss of capacity. The lithium ions are in this case bonded by the active material (which contains carbon) of the negative electrode and are no longer available for charge transport. In order to compensate for this loss of capacity, it has already been proposed to fit a lithium ion reservoir by adding n-butyllithium or lithium iodide to the negative electrode. Losses of lithium ions which are lost by reaction with the electrolyte, impurities or changes in the chalkogen compounds are also intended to be compensated for in this way.

European Patent Document EP-A-201038 proposes that the positive and/or negative electrode be doped with lithium ions. After this, the discharge capacity of the positive electrode is preferably dimensioned to be 1.1 to 3 times greater than that of the negative electrode. Furthermore, it is known from the document U.S. Pat. No. 5,162,176 for the negative electrode, which contains carbon, to have lithium added in advance, amounting to from 1 to 6% by weight of the electrode mass, in order to compensate for the irreversible lithium loss. The known lithium ion cells are sensitive to decomposition reactions when handled in air, as a result of lithium being added to the active materials of the electrodes. Complex and costly drying room methods must be used to manufacture them. The cell which is known from the document U.S. Reissue Pat. No. 33,306 also has the disadvantage that the lithium metal, which is in direct contact with the anode material that contains carbon, leads to a compound which is very highly reactive and involves an increased production cost.

SUMMARY OF THE INVENTION

The invention is based on the object of specifying a lithium ion cell which has low losses of capacity caused by irreversibly bonded lithium ions and, at the same time, can nevertheless be manufactured easily.

According to the invention, the object is achieved in that the cell contains lithium metal or a lithium alloy in a form physically separated from the electrodes, the lithium metal or the lithium alloy having a connection for the main lead of an electrode and, via the electrolyte, an ionic connection for the electrodes. The lithium metal, which is connected to the electrodes by the electrolyte, or the lithium alloy represents a reservoir for lithium ions which are lost as a result of irreversible reactions and would thus lead to a loss of capacity in the cell. The use of metallic lithium or of a lithium alloy such as LiAl can be handled easily in production. In addition, the changes which occur only during the life of a lithium ion cell as a result of reaction with the electrolyte can be compensated for by the lithium reservoir. The same also applies to changes in the lithium ion consumption and emission capability of the active electrode materials. The amount of lithium metal or of the lithium available in the lithium alloy is preferably such that it corresponds to 20 to 50%; of the lithium which can theoretically be cycled in the cell. As a result of the proposed dimensioning of the amount of lithium or lithium alloy, any reduction in the capacity of the lithium ion cell, expressed as mAh/g total mass, remains low. The lithium reservoir is preferably fitted in the lithium ion cell in such a manner that the elementary lithium metal or a lithium alloy is contained in the cell as a disk or film. In prismatic cells or wound cells containing a plurality of electrodes, the lithium disk or film is preferably located on the container base. The arrangement of the lithium disk or film according to the invention ensures that the lithium ions are subsequently delivered more uniformly. The chalkogen compounds $Li_xMn_yO_z$, $Li_xCoO_2$ or $Li_xNiO_2$ which contain lithium are preferably used as the active material for the cathode, and a carbon material having a carbon content of >99.5% and a layered structure is preferably used as the active material for the anode, the carbon material having a BET specific surface area of between 0.5 and 20 m$^2$/g, and a layer separation $d_{002}$ of between 0.335 and 0.339 nm.

The lithium ion cells according to the invention are produced in such a manner that the uncharged electrodes and lithium metal or a lithium alloy are fitted into the cell, and the cell is then filled with electrolyte and sealed.

Before being charged for the first time, the cells are preferably stored for up to 10 days. The potential difference between the lithium metal or the lithium alloy and the negative electrode material (which contains carbon) and/or the chalkogen (which contains lithium) of the negative electrode in this case causes lithium ions to migrate to the points at which lithium ions are irreversibly bonded, or the reaction of traces of water introduced in production. The electrodes are preferably short-circuited during the storage time period, so that both electrodes are electrically connected to the lithium metal or to the lithium alloy.

The loss of capacity of up to 50% of the original charge which occurs in the known cells after the initial charge is reduced to about 5 to 10% in the cells according to the invention.

BRIEF DESCRIPTION OF THE DRAWINGS

A lithium ion cell according to the invention will be explained in more detail using the example of a wound cell and FIG. 1.

DETAILED DESCRIPTION

Figure 1:
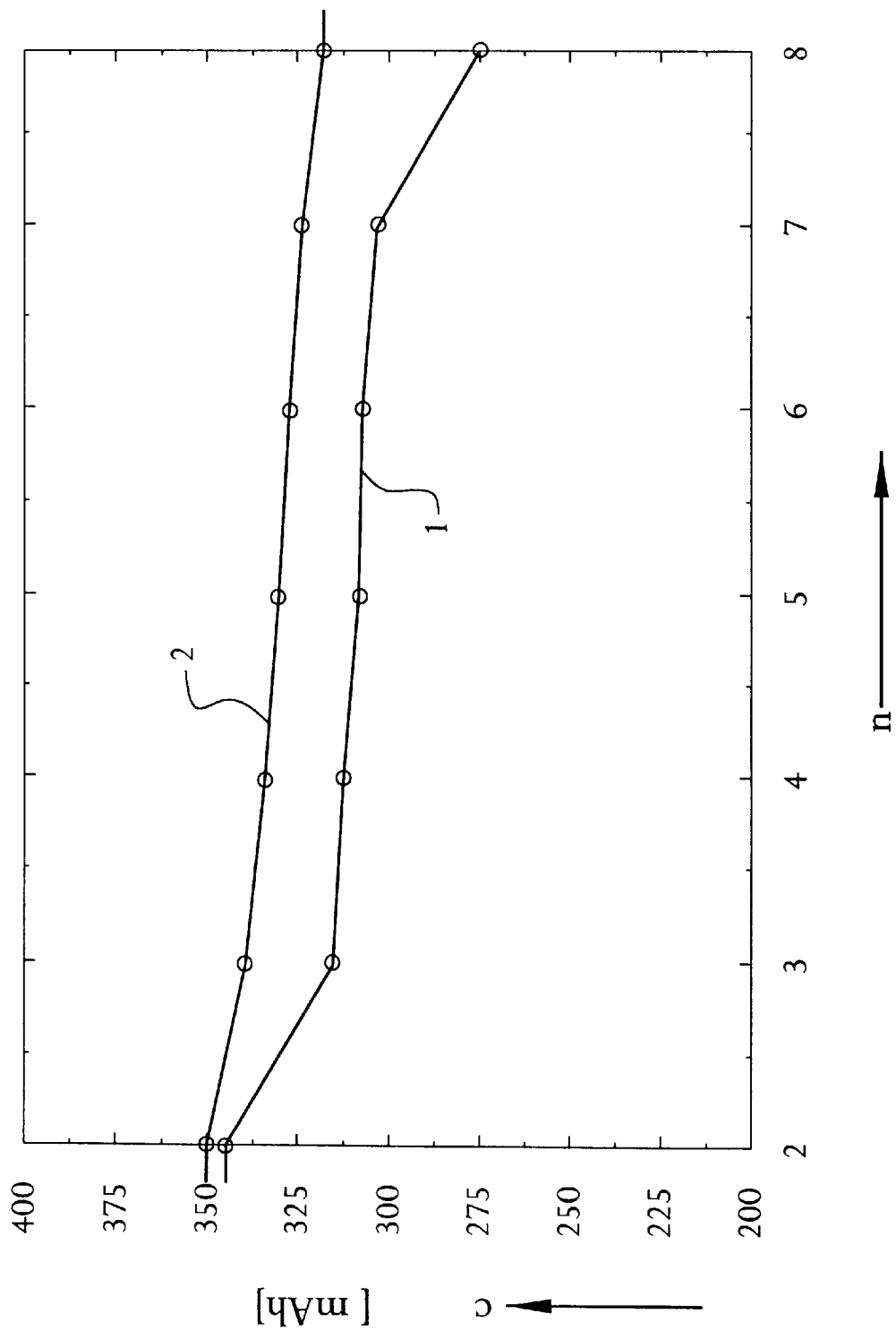

FIG. 1 in this case shows the capacities [C] of a comparative cell (1) and of a lithium ion cell (2) according to the invention, as a function of the number of cycles [n].

Comparative example 3.25 g $LiMn_2O_4$ is dispersed in water with 15 mg carbon black and 10 mg polyacrylate binder. The dispersion is applied to a 20 $\mu$m thick aluminum foil, is dried, and is rolled to produce a positive electrode whose dimensions are 34×3.85×0.0175 cm.

950 mg graphite powder is dispersed in water together with 50 mg binder and are applied to a 15 $\mu$m thick copper foil, are dried and are rolled to form a negative electrode whose dimensions are 34×3.85×0.075 cm.

The two electrodes are now placed one on top of the other with the ground sides facing, separated by a microporous polypropylene membrane, and are rolled up to form a winding with a diameter of 13 mm and a length of 42 mm.

The winding is inserted in a cell container (size AA), the negative electrode is connected to the container, and the positive electrode is connected to the pole entry at the top of the cell. The cell is then filled with 0.5 g electrolyte, composed of a 50:50% mixture by volume of ethylene carbonate and diethyl carbonate, and is sealed. Cycles at about 250 mA in the voltage range between 3.3 and 4.3 V can be carried out with a charge and discharge current of 75 mA.

EXAMPLE 1

A lithium ion cell according to the invention is produced in an analogous manner to the comparative example, with the difference that a lithium disk with a diameter of 12 mm and a thickness of 0.5 mm is inserted in the base of the cell container. The lithium disk is short-circuited to the negative electrode via the cell container. The cell was stored for one week before cycling.

FIG. 1 shows the comparison of the capacity [C] which can be cycled between the comparative lithium ion cell (1) and the lithium ion cell according to the invention (2). The capacity which can be cycled with the lithium ion cell according to the invention (2) is about 20% greater than that of the comparative cell (1).

I claim:

1. A lithium ion cell, comprising:
   a positive electrode containing a chalkogen compound, containing lithium, of a transition metal;
   a non-aqueous electrolyte;
   a separator-isolated negative electrode containing carbon; and
   lithium metal or a lithium alloy in a form apart from the positive and negative electrodes, the lithium metal or the lithium alloy having a connection for the main lead of an electrode and, via the electrolyte, an ionic connection for the electrodes.

2. The lithium ion cell of claim 1, wherein the amount of lithium metal or lithium contained in the lithium alloy corresponds to 20 to 50% of the lithium that can theoretically be cycled in the cell.

3. The lithium ion cell of claim 1, wherein the lithium metal or the lithium alloy is contained in the cell as a disk or film.

4. The lithium ion cell of claim 3, wherein the lithium disk or film is located on a container base of one of (1) a prismatic cell containing a plurality of electrodes and (2) a wound cell.

5. The lithium ion cell of claim 1, wherein $Li_xMn_yO_x$, $Li_xCoO_2$, or $Li_xNiO_2$ is used as the chalkogen compound containing lithium.

6. The lithium ion cell of claim 1, wherein a carbon material having a carbon content of >99.5% and a layered structure is used as an active material for the negative electrode, wherein the carbon material has a BET specific surface area of between 0.5 and 20 $m^2/g$, and a layer separation $d_{002}$ of between 0.335 and 0.339 nm.

7. The lithium ion cell of claim 1, wherein:
   the amount of lithium metal or lithium contained in the lithium alloy corresponds to 20 to 50% of the lithium that can theoretically be cycled in the cell;
   the lithium metal or the lithium alloy is contained in the cell as a disk or film located on a container base of one of (1) a prismatic cell containing a plurality of electrodes and (2) a wound cell;
   $Li_xMn_yO_x$, $Li_xCoO_2$, or $Li_xNiO_2$ is used as the chalkogen compound containing lithium; and
   a carbon material having a carbon content of >99.5% and a layered structure is used as an active material for the negative electrode, wherein the carbon material has a BET specific surface area of between 0.5 and 20 $m^2/g$, and a layer separation $d_{002}$ of between 0.335 and 0.339 nm.

8. A method for manufacturing the lithium ion cell of claim 1, wherein the uncharged electrodes and the lithium metal or the lithium alloy are fitted into the cell, and the cell is then filled with electrolyte and sealed.

9. The method of claim 8, wherein the cells are stored for up to 10 days before being charged for the first time.

10. The method of claim 9, wherein the electrodes are short-circuited during the storage time period, so that both electrodes are electrically connected to the lithium metal or the lithium alloy.

* * * * *